No. 746,806. PATENTED DEC. 15, 1903.
J. H. FEDELER.
TALKING MACHINE RECORD.
APPLICATION FILED JULY 27, 1903.

NO MODEL.

Witnesses
John Osterman
M. F. Lynch

Inventor
John H Fedeler

No. 746,806. Patented December 15, 1903.

UNITED STATES PATENT OFFICE.

JOHN H. FEDELER, OF SCHENECTADY, NEW YORK.

TALKING-MACHINE RECORD.

SPECIFICATION forming part of Letters Patent No. 746,806, dated December 15, 1903.

Application filed July 27, 1903. Serial No. 167,220. (No model.)

*To all whom it may concern:*

Be it known that I, JOHN H. FEDELER, a citizen of the United States, and a resident of Schenectady, in the county of Schenectady and State of New York, have invented certain new and useful Improvements in Talking-Machine Records, of which the following is a specification.

My invention relates to records for talking-machines—such as phonographs, gramophones, &c.—and its object is to provide means by which records for such machines may be adjusted to reproduce the music or sound at the same speed as that at which the record was originally taken. In many cases in order to get the best effect from the record it is important that the exact speed at which the record was made should be reproduced. Although in practice phonographs are usually supplied with governors by which the speed may be adjusted, nevertheless no exact information as to the proper speed of each record is given; but the adjustment must be made according to the judgment of the operator. Moreover, if a notice as to the proper speed of operation accompanied each record it would afford no assistance in the proper adjustment of the governor unless a tachometer or other speed-indicating device was used. By my invention the speed can be properly adjusted with great exactness, so that not only the original sounds, but also the exact time or tempo of these sounds may be reproduced. Furthermore, the adjustment is accomplished without the use of a tachometer or similar auxiliary mechanism.

Figure 1:
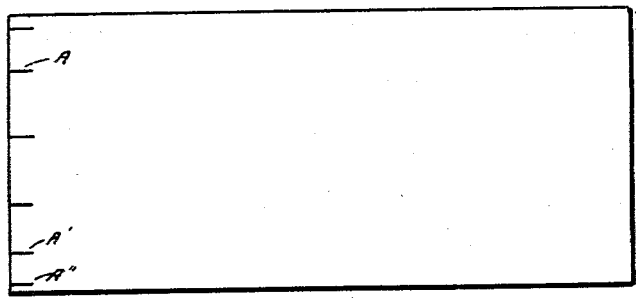
Figure 2:
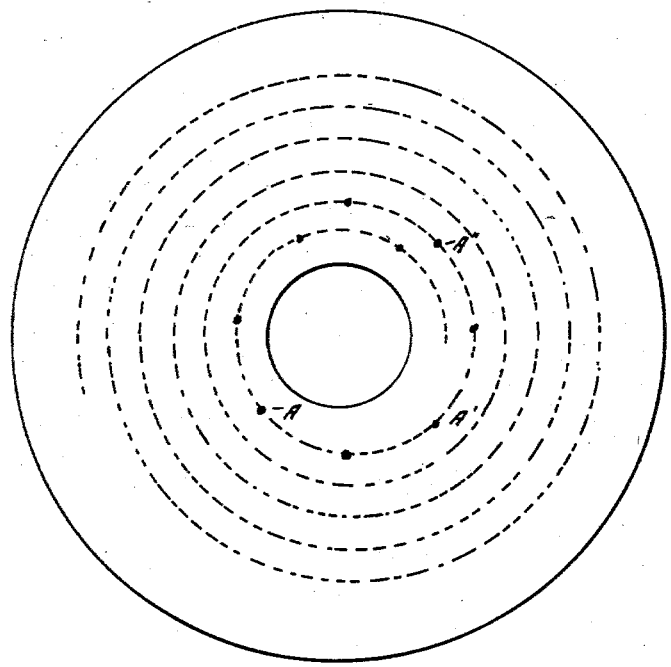

In the accompanying drawings, Figure 1 shows diagrammatically a cylindrical record of the form usually employed in phonographs. Fig. 2 shows diagrammatically a record in the form of a circular plate such as is used in some machines.

In the form shown in Fig. 1 the actuating member of the instrument travels around the record in a spiral from one end to the other. In order to obtain the indication for the proper speed, I form at one end of the record a series of index-marks A A', which may be either raised or depressed and which will produce a sound or knock in the instrument. It is evident that if these marks are so placed that when the record is revolving at the proper speed a fixed number of marks will correspond to a certain interval of time. Then by counting the knocks or sounds produced by these marks the speed-governor may be properly adjusted to give exactly the correct speed. The index-marks A A' may be spaced on the record arbitrarily and then counted while the machine is running at the same speed as while the music or other record is being produced, or the marks may be made by the stylus of the instrument itself responding to gong or clock strokes, producing a fixed number of marks in a given time. In either case and with the marks produced in either of the ways described a simple notice accompanying the record of the proper number of these sounds for a given time will enable the operator to adjust the machine which is to reproduce the music or other sounds of the record to exactly the correct speed. The marks may be placed at either end of the record, as is most convenient. It will of course be understood that the sounds produced by these marks are used only for the purpose of adjusting the speed of the governor and do not occur during the reproduction of the music or other sounds of the record proper.

In the form of record shown in Fig. 2 the actuating member of the instrument travels around the plate in a spiral, as indicated by the curve. The marks A A' may be placed at either end of the spiral. The purpose and operation is the same as has been already explained and requires no further description.

It is obvious that a great variety of marks may be used for the purpose of my invention, and the marks may be made in a number of ways. Accordingly I do not desire to limit myself to the particular construction and arrangement of parts here shown, since changes therein which do not depart from the spirit of my invention and which are within the scope of the appended claims will be obvious to those skilled in the art.

Having thus fully described my invention, I claim as new and desire to protect by Letters Patent—

1. As a new article of manufacture, a talking-machine record with index-marks on its surface adapted to pass a certain point so that the frequency of their passing said point can be compared to a unit of time.

2. As a new article of manufacture, a talking-machine record having index-marks in its record-surface and adapted to make sounds of a given frequency whereby the speed of the machine may be adjusted.

3. A record for a talking-machine provided in its record-surface with indicating-marks adapted to produce in said machine a series of arbitrary sounds, a certain number of said sounds corresponding to a fixed period of time when said record is operating at proper speed.

Signed at Pittsfield, in the county of Berkshire and State of Massachusetts, this 9th day of July, A. D. 1903.

JOHN H. FEDELER.

Witnesses:
FRDR. W. KNOPPE,
M. S. VAN VLEET.